United States Patent
Qian et al.

(10) Patent No.: US 9,570,208 B2
(45) Date of Patent: Feb. 14, 2017

(54) CARBON NANOTUBE COMPOSITE WIRE

(71) Applicant: Beijing FUNATE Innovation Technology Co., LTD., Beijing (CN)

(72) Inventors: Li Qian, Beijing (CN); Yu-Quan Wang, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 0 days.

(21) Appl. No.: 14/693,893

(22) Filed: Apr. 23, 2015

(65) Prior Publication Data

US 2015/0310957 A1    Oct. 29, 2015

(30) Foreign Application Priority Data

Apr. 23, 2014    (CN) .......................... 2014 1 0164343

(51) Int. Cl.
| H01B 5/14 | (2006.01) |
| H01B 1/04 | (2006.01) |
| B82Y 99/00 | (2011.01) |

(52) U.S. Cl.
CPC ........ H01B 1/04 (2013.01); H01B 5/14 (2013.01); *B82Y 99/00* (2013.01)

(58) Field of Classification Search
CPC ............. H01B 1/00; H01B 7/00; H01B 11/00; H02G 15/00; Y10S 977/932; B82Y 99/00
USPC .. 174/110 R, 113 R, 120 R, 121 R; 977/734, 977/742
See application file for complete search history.

(56) References Cited

U.S. PATENT DOCUMENTS

| 8,318,295 | B2 | 11/2012 | Wang et al. | |
|---|---|---|---|---|
| 2008/0170982 | A1* | 7/2008 | Zhang | B82Y 10/00 423/447.3 |
| 2008/0251274 | A1* | 10/2008 | Lee | H01B 11/1817 174/113 R |
| 2009/0255706 | A1 | 10/2009 | Jiang et al. | |
| 2010/0163275 | A1* | 7/2010 | Hiel | B29C 70/52 174/124 R |
| 2011/0005808 | A1* | 1/2011 | White | H01B 1/026 174/126.2 |
| 2011/0051447 | A1 | 3/2011 | Lee | |
| 2011/0095237 | A1 | 4/2011 | Liu et al. | |
| 2011/0155713 | A1 | 6/2011 | Wang et al. | |
| 2012/0000691 | A1* | 1/2012 | Shah | B82Y 30/00 174/102 R |
| 2012/0090982 | A1* | 4/2012 | Fullerton | B82Y 30/00 204/156 |

(Continued)

FOREIGN PATENT DOCUMENTS

| CN | 101633500 | 1/2010 |
| CN | 101976594 | 2/2011 |

(Continued)

*Primary Examiner* — William H Mayo, III
(74) *Attorney, Agent, or Firm* — Zhigang Ma

(57) ABSTRACT

A carbon nanotube composite wire includes a carbon nanotube wire and a metal layer. The carbon nanotube wire includes a plurality of carbon nanotubes spirally arranged along an axial direction of the carbon nanotube wire. The diameter of the carbon nanotube wire ranges from about 1 micrometer to about 30 micrometers. The twist of the carbon nanotube wire ranges from about 250 t/cm to about 300 t/cm. The metal layer is coated on a surface of the carbon nanotube wire. The thickness of the metal layer ranges from about 1 micrometer to about 5 micrometers.

9 Claims, 2 Drawing Sheets

(56) References Cited

U.S. PATENT DOCUMENTS

| | | | | |
|---|---|---|---|---|
| 2012/0125656 A1* | 5/2012 | Wei | ......................... | B82Y 30/00 |
| | | | | 174/103 |
| 2012/0163758 A1* | 6/2012 | McCullough | ............ | H01B 7/14 |
| | | | | 385/101 |
| 2012/0186851 A1* | 7/2012 | Winterhalter | .......... | H01B 5/105 |
| | | | | 174/113 C |
| 2012/0247800 A1* | 10/2012 | Shah | ......................... | H01B 1/24 |
| | | | | 174/36 |
| 2012/0298396 A1* | 11/2012 | Hong | .................. | C01B 31/0446 |
| | | | | 174/107 |
| 2014/0131096 A1* | 5/2014 | Silverman | .......... | H01B 11/1008 |
| | | | | 174/74 R |

FOREIGN PATENT DOCUMENTS

| | | |
|---|---|---|
| CN | 102040212 | 5/2011 |
| CN | 102111926 | 6/2011 |
| CN | 103276486 | 9/2013 |
| CN | 203178958 | 9/2013 |
| JP | 2007-285882 | 11/2007 |
| JP | 2009-252745 | 10/2009 |
| JP | 2013-235808 | 11/2013 |
| TW | 200939249 | 9/2009 |
| TW | 201241843 | 10/2012 |

\* cited by examiner

CARBON NANOTUBE COMPOSITE WIRE

CROSS-REFERENCE TO RELATED APPLICATIONS

This application claims priority to Chinese Patent Application No. 201410164343.1, filed on Apr. 23, 2014, the disclosure of which is incorporated herein by reference. The application is also related to co-pending applications entitled, Ser. No. 14/693,892 "BINDING WIRE AND SEMICONDUCTOR PACKAGE STRUCTURE USING THE SAME", filed Apr. 23, 2015 U.S. application Ser. No. 14/693,894 "HOT WIRE ANEMOMETER", filed Apr. 23, 2015 ; U.S. application Ser. No. 14/693,895 "DEFROSTING GLASS, DEFROSTING LAMP AND VEHICLE USING THE SAME", filed Apr. 23, 2015; U.S. application Ser. No. 14/693,897, "WIRE CUTTING ELECTRODE AND WIRE CUTTING DEVICE USING THE SAME", filed Apr. 23, 2015; U.S. application Ser. No. 14/693,898 "CONDUCTIVE MESH AND TOUCH PANEL USING THE SAME", filed Apr. 23 2015; U.S. application Ser. No. 14/693,899 "ELECTROMAGNETIC SHIELDING MATERIAL AND CLOTHING USING THE SAME", filed Apr. 23, 2015; U.S. application Ser. No. 14/693,901 "MASS FLOWMETER", filed Apr. 23, 2015.

FIELD

The present disclosure relates to a carbon nanotube composite wire.

BACKGROUND

A conventional ultrafine wire is made of metal or alloy. However, when a diameter of the ultrafine wire is 1 micrometer-50 micrometers, a tensile strength of the ultrafine wire will be significantly reduced.

Since carbon nanotubes have good mechanical properties, the carbon nanotubes are widely used to make an ultrafine wire. A conventional carbon nanotube wire comprises a plurality of microscopic carbon nanotubes connected to each other. Although the carbon nanotube wire has high mechanical strength, the connection between adjacent carbon nanotubes has high resistance, and the conductivity of the carbon nanotube wire can be improved.

In order to improve the conductivity of the carbon nanotube wire, the surface of the carbon nanotube wire is coated by a metal layer with a thickness of 1 nanometer to 50 nanometers. Comparing to the carbon nanotube wire consisting of carbon nanotubes, the electric conductivity of the carbon nanotube wire with the metal layer is improved. However, the metal layer is thin, and is easily oxidized, so the durability of the carbon nanotube wire is low.

BRIEF DESCRIPTION OF THE DRAWINGS

Implementations of the present technology will now be described, by way of example only, with reference to the attached figures.

DETAILED DESCRIPTION

Figure 1:
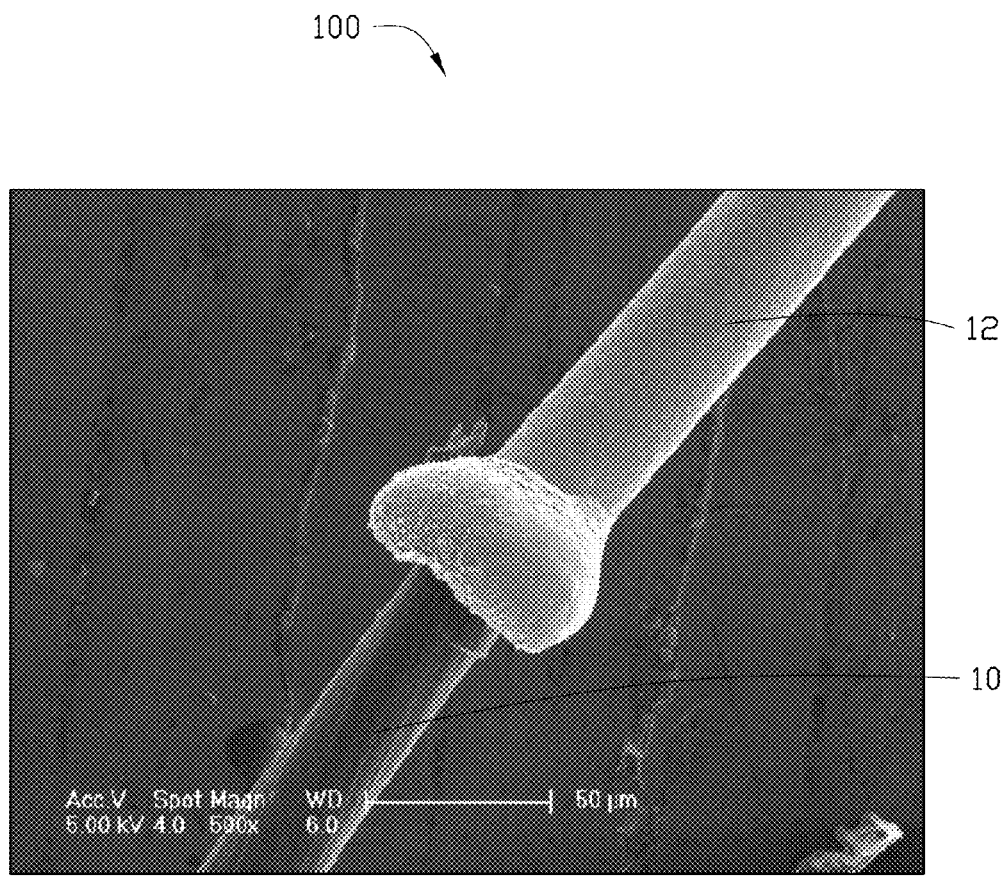
FIG. 1 is a scanning electron microscope (SEM) image of a carbon nanotube composite wire.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that apply throughout this disclosure will now be presented.

The term "comprise" or "comprising" when utilized, means "include or including, but not necessarily limited to"; it specifically indicates open-ended inclusion or membership in the so-described combination, group, series, and the like.

FIG. 1 illustrates that a carbon nanotube composite wire comprising a carbon nanotube wire 10, sometimes referred to as a carbon nanotube yarn, and a metal layer 12 coated on a surface of the carbon nanotube wire 10.

The carbon nanotube wire 10 comprises a plurality of carbon nanotubes spirally arranged along an axial direction of the carbon nanotube wire 10. In one embodiment, the carbon nanotube wire 10 consists of a plurality of carbon nanotubes spirally arranged along the axial direction of the carbon nanotube wire 10. The plurality of carbon nanotubes are secured together by van der Waals force. The carbon nanotube wire 10 is formed by twisting a carbon nanotube film. The carbon nanotube film can be drawn from a carbon nanotube array. The carbon nanotube film comprises a plurality of carbon nanotubes parallel with each other. In one embodiment, the carbon nanotube film can be twisted clockwise to form an S-twist; in another embodiment, the carbon nanotube wire can be twisted counterclockwise direction to form a Z-twist. The plurality of carbon nanotubes in the carbon nanotube film are substantially oriented along an axial direction of the carbon nanotube film, and joined end-to-end by van der Waals force in the axial direction of the carbon nanotube film. Therefore when the carbon nanotube film is twisted, the plurality of carbon nanotubes in the carbon nanotube wire 110 are spirally arranged along the axial direction, joined end to end by van der Waals force in an extended direction of the plurality of carbon nanotubes.

During the twisting process of the carbon nanotube film, a space between adjacent carbon nanotubes will become smaller along the axial direction of the carbon nanotube film, and a contact area between the adjacent carbon nanotubes will increase. Therefore, in the axial direction of the carbon nanotube wire 10, the van der Waals force between the adjacent carbon nanotubes is increased, and the adjacent carbon nanotubes in the carbon nanotube wire 10 are closely connected. In one embodiment, the space between adjacent carbon nanotubes in the axial direction of the carbon nanotube wire 10 is less than 10 nm. In one embodiment, the space between adjacent carbon nanotubes in the axial direction of the carbon nanotube wire 10 is less than 5 nm. In another embodiment, the space between adjacent carbon nanotubes in the axial direction of the carbon nanotube wire 10 is less than 1 nm. Since the space between adjacent carbon nanotubes in the axial direction of the carbon nanotube wire 10 is small, and the adjacent carbon nanotubes are closely connected by van der Waals force, the surface of the carbon nanotube wire 10 is smooth and has a high density. Since the carbon nanotube wire 10 has a smooth and dense surface structure, the metal layer 12 and the carbon nanotube wire 10 can form a close bond.

A diameter of the carbon nanotube wire 10 ranges from about 1 micrometer to about 30 micrometers. A twist of the carbon nanotube wire 10 ranges from about 10 t/cm (turns per centimeter) to about 300 t/cm. The twist is the number of turns per unit length of the carbon nanotube wire. With an increase in the twist, the space between adjacent carbon nanotubes in the axial direction of the carbon nanotube wire 10 is reduced, and an attractive force between adjacent carbon nanotubes will increase. However, when the increase in the twist is too large, the attractive force between adjacent carbon nanotubes will be reduced. Thus, a predetermined twist, to the optimal diameter, gives the carbon nanotube wire 10 excellent mechanical properties.

When the diameter of the carbon nanotube wire 10 is less than 10 micrometers, the twist of the carbon nanotube wire 10 ranges from about 250 t/cm to about 300 t/cm. When the diameter of the carbon nanotube wire 10 ranges from about 10 micrometers to about 20 micrometers, the twist of the carbon nanotube wire 10 ranges from about 200 t/cm to about 250 t/cm. When the diameter of the carbon nanotube wire 10 ranges from about 25 micrometers to about 30 micrometers, the twist of the carbon nanotube wire 10 ranges from about 100 t/cm to about 150 t/cm. The mechanical strength of the carbon nanotube wire 110 is 5 to 10 times stronger than the mechanical strength of gold wire of the same diameter. In one embodiment, the diameter of the carbon nanotube wire 10 is about 25 micrometers, and the twist of the diameter of the carbon nanotube wire 10 is about 100 t/cm.

The metal layer 12 is uniformly coated on the outer surface of the carbon nanotube wire 10. A thickness of the metal layer 12 ranges from about 1 micrometer to about 5 micrometers. When the thickness of the metal layer 12 ranges from about 1 micrometer to about 5 micrometers, the conductivity of the carbon nanotube composite wire 100 can reach 50% or more of the conductivity of the metal layer 12. When the thickness of the metal layer 12 is too small, for example less than 1 micrometer, the electrical conductivity of carbon nanotube composite wire 100 is not significantly improved. However, the metal layer 12 will be easily oxidized, and the conductivity and life of the carbon nanotube composite wire 100 will be further reduced. In addition, experiments show that when the thickness of the metal layer 12 is greater than a certain value, for example greater than 5 micrometers, the conductivity of the carbon nanotube composite wire 100 does not significantly increase along with the increase of the diameter of the carbon nanotube composite wire 100.

The material of the metal layer 12 may be a metal or metal alloy with good conductivity, such as gold, silver, copper. In one embodiment, the material of the metal layer 12 is copper, the thickness of the metal layer 12 is about 5 micrometers. The conductivity of the carbon nanotube composite wire 100 can reach $4.39 \times 10^7$ S/m, the conductivity of the carbon nanotube composite wire 100 is about 75% of the conductivity of copper metal.

Figure 2:
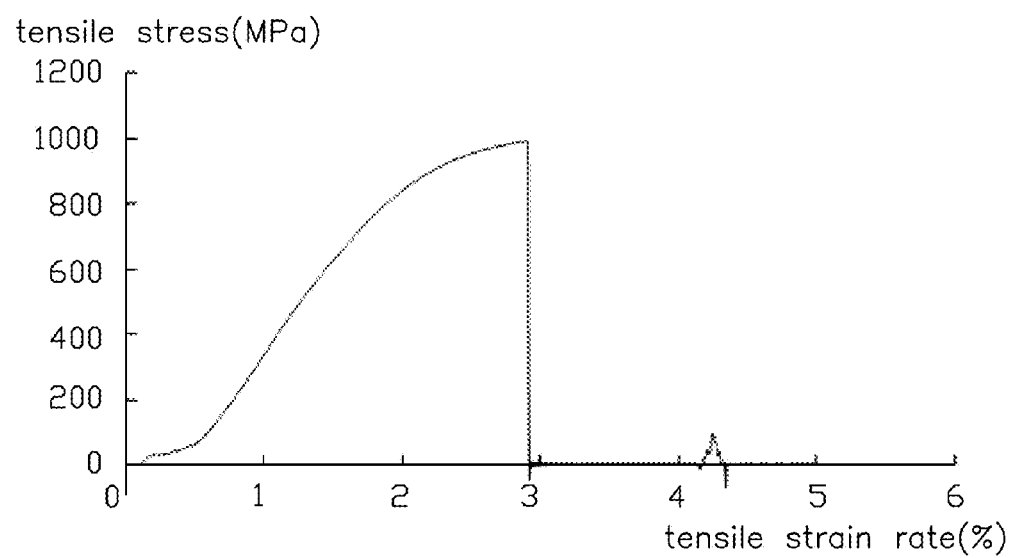
FIG. 2 is a tensile stress image of the carbon nanotube composite wire in FIG. 1.

FIG. 1 illustrates that in one embodiment, the diameter of the carbon nanotube composite wire 100 is about 35 micrometers. FIG. 2 illustrates that tensile stresses on an embodiment of the carbon nanotube composite wire 100 can reach 900 MPa or more, this being 9 times of that of the gold wire with same diameter. FIG. 2 also further shows that tensile strain rate of the carbon nanotube composite wire 100 is about 3%.

The metal layer 12 can be coated on the outer surface of the carbon nanotube wire 10 by electroplating, electroless plating, or by vapor deposition method.

The carbon nanotube composite wire of the present embodiment has the following advantages. First, since the thickness of the metal layer ranges from about 1 micrometer to about 5 micrometers, which allows good oxidation resistance and durability of the metal layer. Second, the carbon nanotube composite wire will exhibit an electrical skin effect, the main current will be conducted through the metal layer of the carbon nanotube composite wire. Therefore, the electrical conductivity of the carbon nanotube composite wire is significantly improved. Third, the diameter of the carbon nanotube wire ranges from 1 micrometer to 30 micrometers, and the twist of the carbon nanotube wire ranges from about 10 t/cm to about 300 t/cm. Thus, the mechanical properties of the carbon nanotube composite wire can be significantly improved. Forth, when the carbon nanotube composite wire is used, because the carbon nanotube has good heat resistance, even if the metal layer is fused by a high temperature, the carbon nanotube wire will not easily break, which allows the carbon nanotube composite wire to maintain an electrical connection. Therefore, the durability of the carbon nanotube composite wire can be improved, and the life of the carbon nanotube composite wire is also increased.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A carbon nanotube composite wire comprising:
    a carbon nanotube wire, comprising a plurality of carbon nanotubes spirally arranged along an axial direction of the carbon nanotube wire;
    a metal layer, coated on a surface of the carbon nanotube wire;
    wherein a diameter of the carbon nanotube wire ranges from about 1 micrometer to about 30 micrometers, a twist of the carbon nanotube wire ranges from about 10 t/cm to about 300 t/cm, and a thickness of the metal layer ranges from about 1 micrometer to about 5 micrometers.

2. The carbon nanotube composite wire of claim 1, wherein the diameter of the carbon nanotube wire is less than 10 micrometers, and the twist of the carbon nanotube wire ranges from about 250 t/cm to about 300 t/cm.

3. The carbon nanotube composite wire of claim 1, wherein the diameter of the carbon nanotube wire ranges about 25 micrometers to about 30 micrometers, and the twist of the carbon nanotube wire ranges from about 100 t/cm to about 150 t/cm.

4. The carbon nanotube composite wire of claim 1, wherein the carbon nanotube wire has an S-twist or a Z-twist.

5. The carbon nanotube composite wire of claim 1, wherein the plurality of carbon nanotubes are secured together by van der Waals force.

6. The carbon nanotube composite wire of claim 1, the plurality of carbon nanotubes in the carbon nanotube wire are joined end to end by van der Waals force in an extended direction of the plurality of carbon nanotubes.

7. The carbon nanotube composite wire of claim 1, wherein a space between adjacent carbon nanotubes in the axial direction of the carbon nanotube wire is less than 10 nanometers.

8. The carbon nanotube composite wire of claim 1, wherein a space between adjacent carbon nanotubes in the axial direction of the carbon nanotube wire is less than 5 nanometers.

9. The carbon nanotube composite wire of claim 1, wherein a material of the metal layer is copper, the thickness of the metal layer is about 5 micrometers.

\* \* \* \* \*